US00RE40663E

(19) United States
(12) Reissued Patent
Silverman

(10) Patent Number: US RE40,663 E
(45) Date of Reissued Patent: Mar. 17, 2009

(54) DIGITAL BATTERY

(75) Inventor: Martin S. Silverman, Camarillo, CA (US)

(73) Assignee: DeNovo Research, LLC, Camarillo, CA (US)

(21) Appl. No.: 11/429,638

(22) Filed: May 4, 2006

Related U.S. Patent Documents

Reissue of:
(64) Patent No.: 6,731,022
Issued: May 4, 2004
Appl. No.: 10/269,802
Filed: Oct. 11, 2002

U.S. Applications:
(60) Provisional application No. 60/329,459, filed on Oct. 11, 2001.

(51) Int. Cl.
*H02J 7/34* (2006.01)

(52) U.S. Cl. ..... 307/43; 307/48; 307/139; 307/140; 307/150

(58) Field of Classification Search ..... 307/43, 307/48, 139, 140, 150
See application file for complete search history.

(56) References Cited

U.S. PATENT DOCUMENTS 389,935 A 9/1888 McDonald
530,804 A 12/1894 Spangenberg
718,846 A * 1/1903 Keirstead
2,649,493 A * 8/1953 Temple
3,083,301 A 3/1963 Turner
3,487,229 A * 12/1969 Krausz
3,600,598 A 8/1971 Foerster
3,755,686 A 8/1973 Woods
3,886,426 A * 5/1975 Daggett
4,760,276 A 7/1988 Lethellier
5,121,046 A * 6/1992 McCullough
5,330,804 A * 7/1994 Allison et al.
5,338,625 A * 8/1994 Bates et al.
5,422,558 A * 6/1995 Stewart
5,459,671 A * 10/1995 Duley
5,514,916 A * 5/1996 Yang
5,563,002 A * 10/1996 Harshe ..... 427/7
5,861,684 A 1/1999 Slade et al.
5,898,239 A * 4/1999 Kawam ..... 307/130
5,914,585 A * 6/1999 Grabon
5,942,808 A 8/1999 Kaneko et al.
5,959,368 A * 9/1999 Kubo et al.
6,023,109 A * 2/2000 Yang
6,104,967 A * 8/2000 Hagen et al.
6,140,799 A 10/2000 Thomasson
6,146,778 A * 11/2000 Rouillard et al. ..... 429/7
6,154,855 A * 11/2000 Norman
6,163,131 A * 12/2000 Gartstein et al.

(Continued)

*Primary Examiner*—Robert L. Deberadinis
(74) *Attorney, Agent, or Firm*—Bruce A. Jagger

(57) ABSTRACT

A dynamic battery array of [individual] *discrete* cells, controllably interconnected for instantaneous dynamic configuration into a plurality of individual power buses having different electrical power output characteristics, each of which is tailored to supply the electrical power required at the instant by a particular electrical load within a circuit. Preferably the cells are fungible and randomly available so that at any given instant any given cell can be poweringly associated with a particular electrical load. The dynamic battery array, consisting of discrete cells lends itself to mounting on physically flexible substrates such as credit cards. The programmable array employs low resistance switch arrays for dynamically and instantaneously forming individual power networks or power buses between selected power cells and individual electrical loads in electrical circuits. The circuits to which such battery arrays are applied are generally complex circuits in which several different loads occur, each of which has a different power requirement.

34 Claims, 3 Drawing Sheets

U.S. PATENT DOCUMENTS 6,395,043 B1 * 5/2002 Shadle et al.
6,430,692 B1 * 8/2002 Kimble et al.
6,483,204 B2 11/2002 Hanaki
6,552,445 B1 4/2003 Yang
6,583,522 B1 * 6/2003 McNulty et al.
6,624,535 B2 * 9/2003 Morrow ..... 307/71
6,882,904 B1 4/2005 Petrie et al.
2002/0113493 A1 * 8/2002 Morrow
2003/0071523 A1 * 4/2003 Silverman

* cited by examiner

Fig. 1
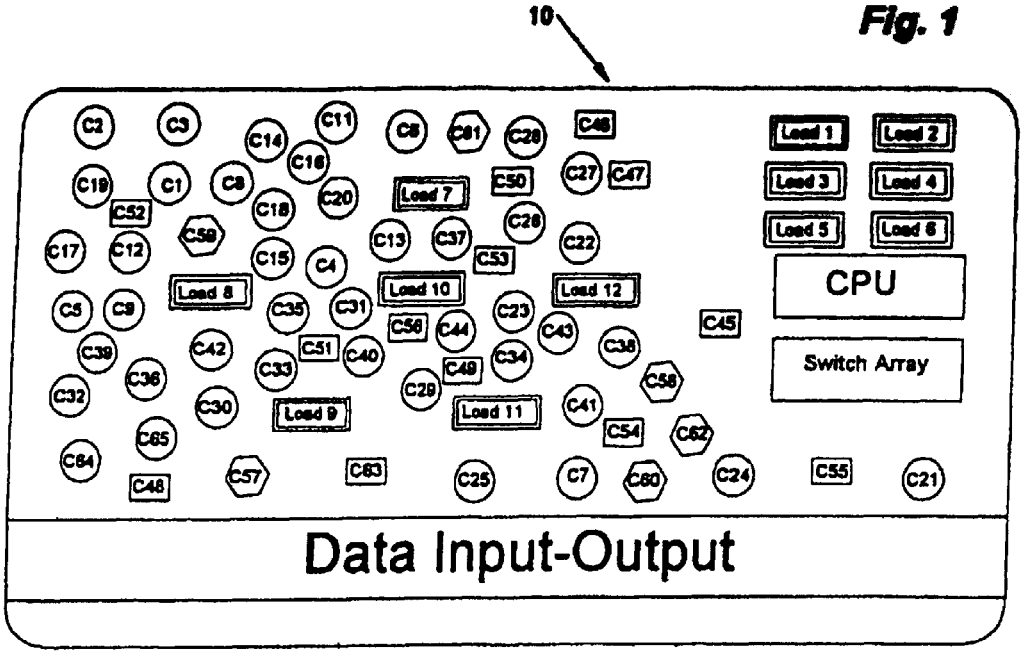
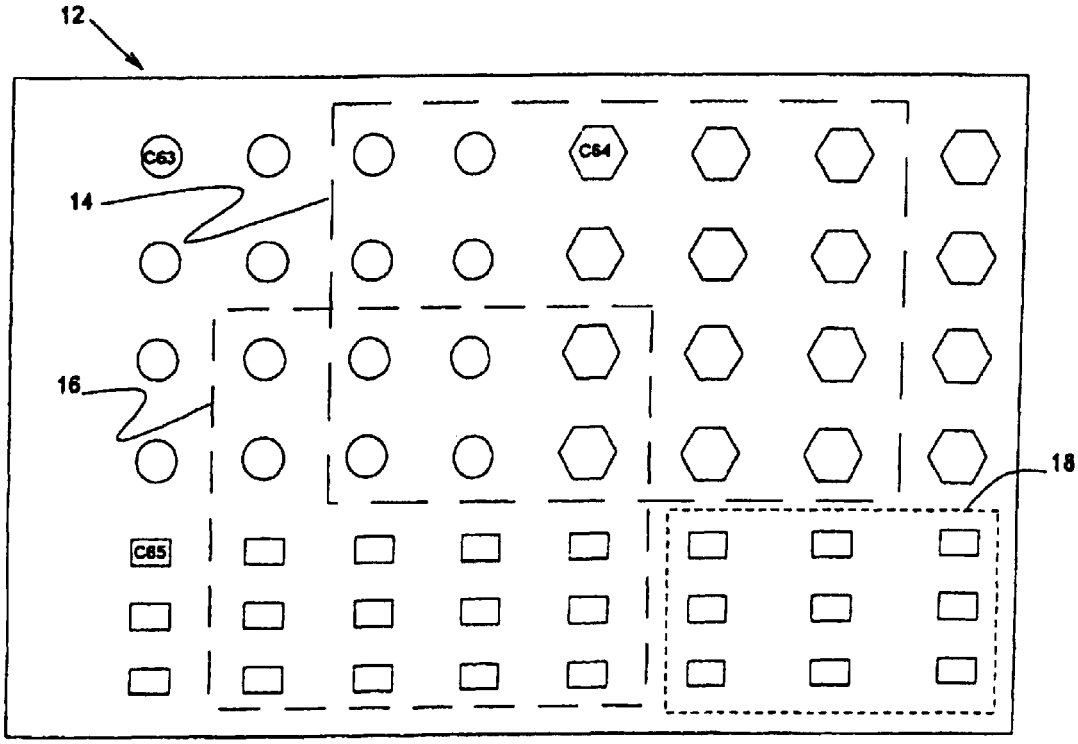
Fig. 2

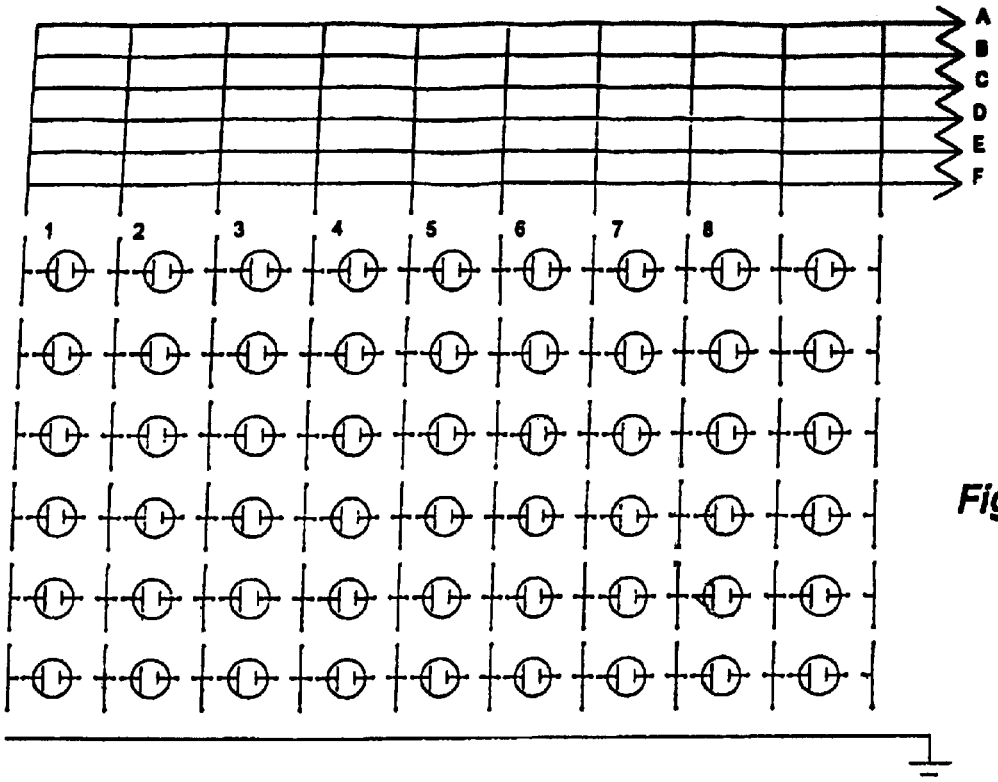
Fig. 3
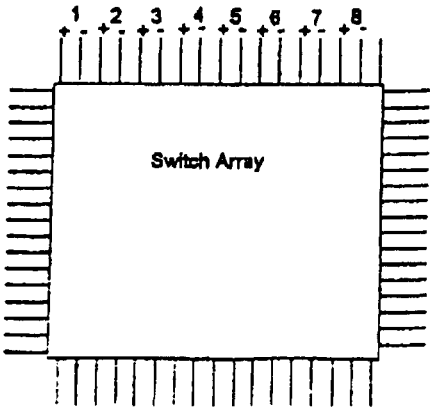
Fig. 4
Fig. 5
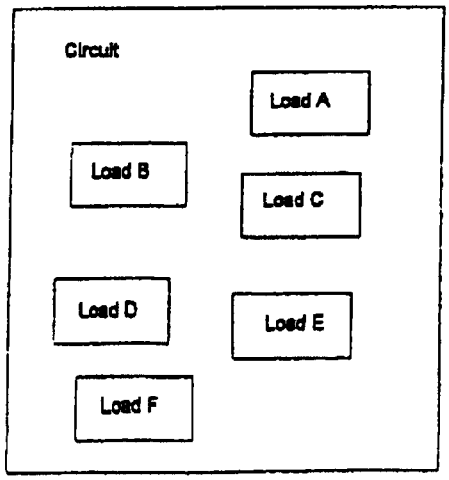

DIGITAL BATTERY

Matter enclosed in heavy brackets [ ] appears in the original patent but forms no part of this reissue specification; matter printed in italics indicates the additions made by reissue.

RELATED APPLICATIONS

[The] *This application is a Reissue Application of U.S. Ser. No. 10/269,802, filed Oct. 11, 2002, now U.S. Pat. No. 6,731,022, granted May 4, 2004, for which the* benefit of Provisional Application Serial No. 60/329,459, filed Oct. 11, 2001 is claimed.

BACKGROUND OF THE INVENTION

1. Field of the Invention

The invention relates in general to battery arrays, and, in particular, to self healing dynamically configurable battery arrays that are capable of forming a plurality instantaneous power buses, each of which is configured to the electrical power requirements of specific components or modules (loads) of an electrical circuit, sometimes referred to herein as a "digital battery" or a "dynamic battery array".

2. Description of the Prior Art

Electronic devices are becoming more and more complex. Such complex electronic devices typically contain a plurality of different components or modules (loads), each of which has its own unique voltage and current requirements. As used here, "load" includes components, modules, separately powered elements of components, and the like. Batteries typically supply power having a predetermined nominal value to a common bus. Power for the individual components is drawn from the common bus and passed through various power conditioning components to provide each of the operative components with the particular current and voltage values that the specific component requires to perform its intended function.

Electrical circuits of all kinds and sizes, including electronic circuits, require the application of electrical energy for their operation. Batteries of one kind or another have long been used for this purpose. Typically, such a battery provides an output with relatively constant parameters such as, for example, voltage and amperage. Generally, some effort is made to see that the values of the battery output parameters remain substantially constant.

Electrical circuits are typically composed of several different operating components and associated electrical energy conditioning components. These different operating components often have different voltage, amperage and other electrical energy parameter requirements. Many of the components in the circuit are included simply to adjust the various values of the output from the battery to the values that are required by the individual operating components. Much of the energy consumed by the circuit is consumed by the electrical energy conditioning components that tailor the output of the battery to the requirements of the various operating components. Much of the expense and difficulty in the construction of a circuit arises from the need for building in such energy conditioning components that are needed only to tailor the output of the battery to meet the requirements of the individual operating components. The overall size and complexity of a circuit is necessarily adjusted to accommodate the inclusion of these energy conditioning components. The effort to miniaturize circuits is hampered by the need for the inclusion of such energy conditioning components in these miniaturized circuits. If these battery output tailoring components could be eliminated great improvements could be made in circuits of all sizes, purposes, and configurations.

Common failure modes of batteries in general are internal shorting or formation of an open circuit. When battery cells are arranged in a static array, the failure of one cell will generally change the parameters of the electrical energy that can be provided by the array. For example, if one of a set of parallel connected battery cells is removed the amperage of the output drops. If one of a set of series connected battery cells is removed the voltage of the output drops. The failure of a cell through an open circuit may completely disrupt the operation of the battery array (for example, in a series arrangement of cells). The failure of a cell through internal shorting may completely disrupt the operation of the battery array. Each cell that fails or becomes partially compromised changes the parameters further.

The operating components in an electrical circuit are generally designed to operate under substantially constant energy parameters. Thus, when the parameters of the output from the battery array change, because of the loss or malfunction of a cell from the battery array, the circuit either stops operating or performs poorly. Various expedients have been proposed for solving this problem. It has been proposed to lithographically fabricate a battery layer that contains a plurality of individual batteries, and a separate layer that contains a plurality of data processing cells. The two layers are electrically insulated from one another, and each data processing cell is electrically connected to its own battery. See, for example, Norman U.S. Pat. No. 6,154,855.

Norman U.S. Pat. No. 6,154,855 proposes to provide fault tolerance in the array of data processing cells by including redundant data processing cells, automatically eliminating bad processing cells from the circuit, and replacing them with spare cells. There is no indication that any power conditioning components have been eliminated from the circuits in Norman's data processing cells, or that such elimination would be possible. Norman discloses a data processing system comprising a monolithic redundant network of data processing cells. It is suggested, inter alia, that the monolithic structure could be in the form of a multilayered thin flexible sheet approximately the size of a credit card. The data processing cells in the network are interchangeable so that duplicate spare cells may be used to provide redundancy. Each cell includes a plurality of components such as, for example, a processor, memory, and input/output means. It is suggested that each cell could also have its own individual battery cell so that there would be full redundancy at the cell level. That is, each data processing cell should have its own individual battery cell in a one-to-one relationship. The battery cells in the expedient proposed by Norman are not fungible as between the data processing cells. This one-to-one relationship would provide a common bus for all of the power consuming components within a data processing cell. It is not likely that all of the components within a cell will operate on the same current and voltage levels. Any adjustment to the power output of the battery cell, which a given component within the data processing cell might require, would have to be provided by power conditioning elements within the circuitry of that data processing cell. It is also suggested by Norman that non-defective neighboring cells in a specific region of the total network might be joined in a power-sharing bus. Whether the proposed connection would be serial or parallel is not clear. Such a common bus with multiple interconnected battery cells would necessarily provide more current or more voltage than a single battery cell could produce, so the power available from a common bus would have different characteristics from that provided from a single battery cell in a single data processing cell. There is no indication as to how power from a common bus could be utilized by individual cells that are designed to run on the output of a single battery cell. Random dynamic connectivity between the individual power consuming components in any given data processing cell, so that each power consuming component has its own individual dynamic fault tolerant power bus is contrary to the teachings of Norman. There is no teaching in Norman that each power consuming component within a data processing cell should have its own individual power bus, and there is no suggestion that there would be any advantage to such an arrangement.

Various expedients had been proposed for providing a dynamic array of battery cells. Harshe U.S. Pat. No. 5,563,002, for example, proposed the use of a programmable battery array with a single output power bus to address the problem of achieving a stable overall voltage or current output despite varying loads and battery charge conditions. Harshe proposes the use of a plurality of discrete cells that are selectively connectable by mechanical switches as the load varies so as to provide a stable output to a single bus. Harshe does not address the problem of dynamically tailoring voltage or current to the individual requirements of each of a plurality of different electrical loads within a single device. Harshe does not suggest that complex electronic devices can be simplified by dynamically interconnecting an array of [individual] *discrete* power cells to simultaneously supply different voltages and currents to separate components or modules within a single complex device. Mechanical switches such as those proposed by Harshe are adapted to accommodating high power demand applications on a single bus. Such high power demand applications are, as noted by Harshe, often beyond the capacity of semiconductor switches. Harshe does not suggest that by dynamically forming a plurality of power buses from a single battery array it is possible to reduce the power that each individual bus carries to levels where small, fast, efficient, inexpensive and reliable semiconductor switches can handle the load without recourse to mechanical switches. Mechanical switches do not lend themselves to random dynamic configuration, that is, two individual battery cells can not be selected at random and electrically connected without regard to their physical locations. The geometry of a mechanically switched battery array is confined physically to what is required to accommodate the switches. Harshe does not teach the provision of an individual power bus for each load, which individual bus is formed instantaneously as required from a plurality of power cells that are substantially fungible as between individual power buses. Mechanical switches inherently exhibit relatively slow response times as compared to solid state devices. It is physically impossible to instantaneously reconfigure multiple power [busses] *buses* using mechanical switches. Harshe's proposed array is not functional as a combined serial-parallel array. If Harshe's proposed array were to in someway be made functional in a combined serial-parallel configuration, and a cell became defective, there is no disclosed way of bypassing that cell on the serial side.

Fault tolerant distributed battery systems had been proposed previously. See, for example, Hagen et al. U.S. Pat. No. 6,104,967. Hagen et al. is directed to a distributed battery system, and particularly the control system for such a battery system for powering electrical vehicles. The load is typically an electric motor, which is supplied from a common power bus. The objective of Hagen et al. is to supply electrical power of predetermined characteristics on a common bus.

The printing of electrochemical cells on flexible substrates had been previously proposed. See, for example, Shadle et al. U.S. Pat. No. 6,395,043. Bates et al. discloses a high energy density thin film microbattery.

Programmable controllers for controlling the operation of multicell battery power systems had been proposed. See, for example, Stewart U.S. Pat. No. 5,422,558. Stewart discloses a plurality of controlled battery modules on a common power supply bus. See also Gartstein et al. U.S. Pat. No. 6,163,131.

The use of one battery in an array of batteries to charge another battery in the array is purportedly disclosed by Garbon U.S. Pat. No. 5,914,585.

Rouillard et al. U.S. Pat. No. 6,146,778 proposes a number of electrochemical cells selectively interconnected in series or parallel through an integrated interconnect board, and irrespective of cell position. The voltage and current characteristics of the overall assembly of cells are said to be alterable by altering the configuration of the connecting pattern. Rouillard et al. discloses a common bus system.

Conventional semiconductor switch arrays provide as many as several million switches, each having several hundred input/output (I/O) ports, all controlled by a central processor unit (CPU). Switching times can be in the order of nanoseconds. Such conventional semiconductor switch arrays, for example, gate arrays, are programmable and include memory capacity. The ON resistance of the semiconductor switches in such arrays can be in the order of a few milliohms.

Power generating cells of various configurations and types are well known. Electrochemical battery couples such as zinc-manganese dioxide, zinc-silver oxide, lithium-cobalt oxide, nickel-cadmium, nickel-metal hydride, metal-air, and the like, are known. Fuel cell couples, such as hydrogen-oxygen, photovoltaic couples such as P and N doped silicon, nuclear cells (P N or PIN junction with an associated Beta particle emitter such as tritium), and the like are known. Other electrical energy storage devices such as capacitors or inductors (the combination comprises a "tank circuit") are known. Energy transducers that produce electrical current or charge such as, for example, a thermo voltaic cell (for example, bimetallic couple), an inductive element, a capacitive element (for example, a piezoelectric element), thermal, acoustic, vibration, and the like actuated transducers, and radio frequency antenna array to gather radio frequency energy are all known.

Conventional flat, planar or wafer type batteries, a single cell (and its seals) extends across the entire areal projection of the battery. Therefore, when the battery is flexed, the shear forces are additive along the full length of the battery and cell. Consequently, a considerable amount of shear force can be exerted on the cell and its seals. This in turn can cause the cell and battery to short, rupture and leak due to failure of the cell seals, or damage to the battery separator, among other modes of failure.

In a variety of conventional battery driven electrical circuits different voltages and currents are required by the various elements that make up the circuit. Conventional battery systems are normally only capable of supplying nominally one voltage at one maximum current, the variety of voltages and currents that are required by the electrical device is provided by what is referred to as "power conditioning", or "electrical energy conditioning" devices. These devices alter or "condition" the voltage and current (the electrical power) that is generated by the battery. These conditioning devices can be "passive" such as resistors or "active" such as a switching boost converter. The use of these devices is inefficient in that they consume electrical energy to operate, introduce expense (in terms of cost of purchase, as well as cost of handling and placement into the circuit), require increasingly valuable real estate on the circuit board, and increase the probability of overall device failure. It is estimated that in the average consumer battery operated product as much as 60 percent of the component count, and 40 percent of the cost of the electronics is due to the numerous power conditioning devices presently required by such circuitry. If the majority of these power-conditioning devices could be eliminated, then electrical circuitry would be more efficient, less costly, more compact and more reliable.

Many improvements and new developments in electronics could be realized if a battery array that is self healing and dynamically configurable to provide a plurality of instantaneous electrical buses to the individual loads in an electrical circuit could be devised. It would be particularly advantageous if such a battery array could be physically flexible.

BRIEF SUMMARY OF THE INVENTION

A preferred embodiment of the digital battery according to the present invention comprises an array of [individual] *discrete* cells, controllably interconnected for instantaneous dynamic configuration into a plurality of power buses having different electrical energy output characteristics, each of which is tailored to supply the energy required at the instant by a particular electrical load within a circuit. Preferably the cells are fungible and randomly available so that at any given instant any given cell can be poweringly associated with a particular electrical load.

A dynamic battery array of the present invention provides increased electrical and physical flexibility, with substantial improvement in battery reliability and efficiency combined with decreased battery and cell production cost. In general, the cost of the product into which the battery array is placed is further reduced in addition to the savings gained from a decrease in battery cost.

A dynamic battery array of the present invention employs low resistance switch arrays for dynamically and instantaneously forming individual power networks or power buses between selected power cells and individual electrical loads in electrical circuits. The low resistance switch arrays (generally less than approximately 0.5, and preferably less than approximately 0.01 ohms of ON resistance per switch) in such dynamic battery arrays are, for example, semiconductor switches, controlled, for example, by a central processor unit (CPU). Preferably several switches are associated with each cell so as to provide the maximum possible electrical flexibility. The operation of the array is preferably programmable. The term "switch array" is intended to include the switches, the switch and circuit control elements such as a CPU, memory of all types, thermal and other sensors, associated elements, and the like. The circuits to which such battery arrays are applied are generally complex circuits in which several different loads occur, each of which has a different power requirement. Such battery arrays are also applicable to single load circuits where the power requirements fluctuate or the maintenance of a precise power level is required for the duration of the charge cycle of the battery array. If a considerable excess of cells is provided, [individual] *discrete* cells in the array can be swapped in and out to maintain desired power levels during, for example, start-up, or near the end of a charge cycle.

Other objects, advantages, and novel features of the present invention will become apparent from the following detailed description of the invention when considered in conjunction with the accompanying drawings.

BRIEF DESCRIPTION OF THE DRAWINGS

The present invention provides its benefits across a broad spectrum of electrical circuits. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referred to the specific examples disclosed.

Referring particularly to the drawings for the purposes of illustration only and not limitation:

FIG. 1 is a diagrammatic view of a preferred embodiment of the invention applied to a conventional credit or debit card form.

FIG. 2 is a diagrammatic view of a battery array according to the present invention showing a variety of cells and dynamic configurations.

FIG. 3 is diagrammatic view of a dynamic battery array showing a plurality of cells, typical ones of which are numbered, and a plurality of individual lettered buses.

FIG. 4 is diagrammatic view of a switch array showing the connector pins numbered to correspond to the numbered cells in FIG. 3 to which they can be connected, and with the polarity of the connections indicated.

FIG. 5 is a diagrammatic view of a circuit showing electrical loads identified by letter to correspond to the lettered buses in FIG. 3.

DETAILED DESCRIPTION OF THE PREFERRED EMBODIMENTS

Figure 6:
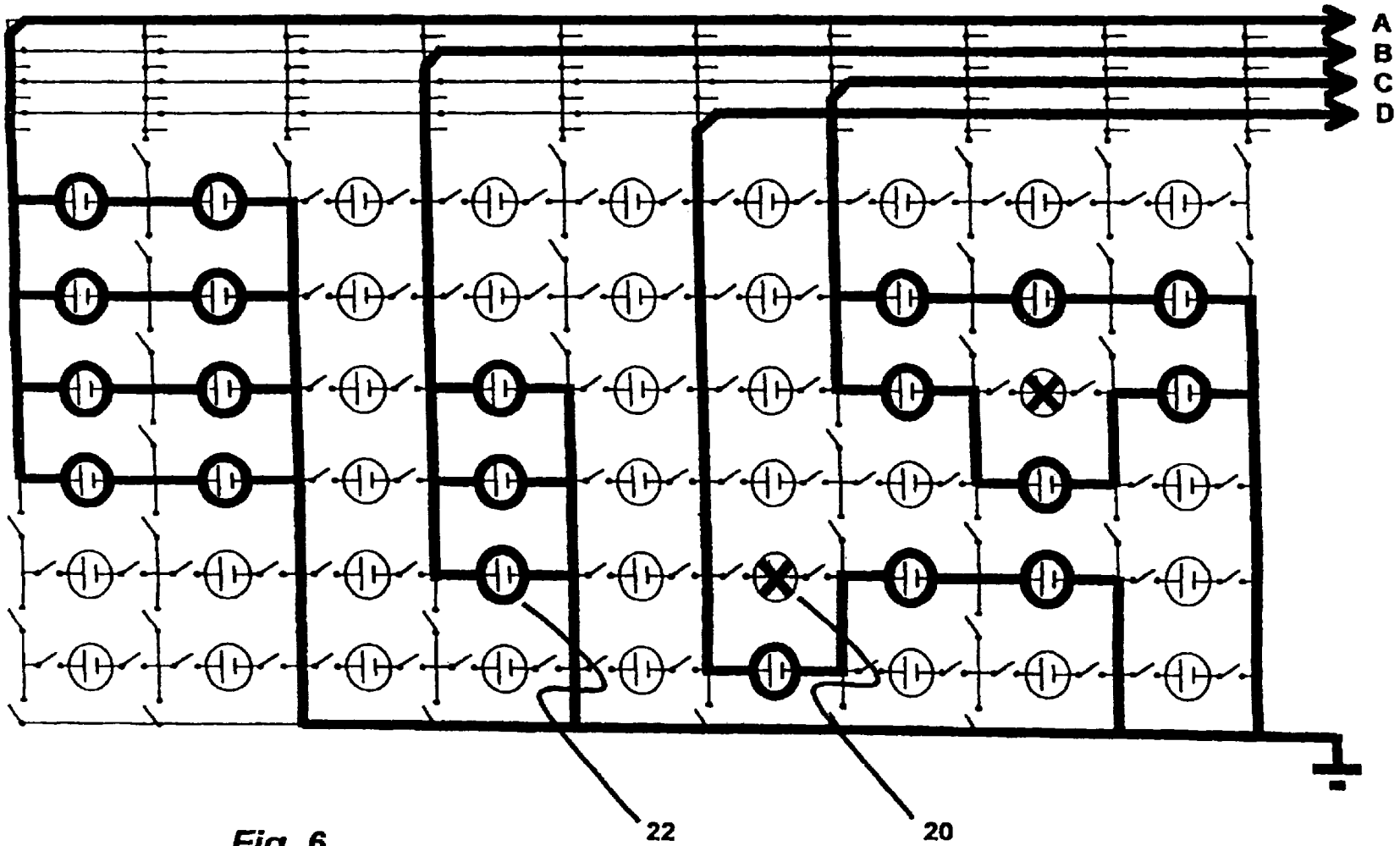
FIG. 6 is a diagrammatic view of a dynamic battery array similar to that of FIG. 3 wherein the instantaneous connection of certain of the [individual] *discrete* cells to form individual buses (illustrated in heavy lines) that are connected to loads A, B, C, and D, respectively (FIG. 5).

Referring now to the drawings wherein like reference numerals designate identical or corresponding parts throughout the several views, there is illustrated generally at 10 in FIG. 1 a battery array according to the present invention applied to a conventional credit card. For reasons of clarity of illustration, the electrical leads are not shown. Twelve different electrical loads, Load 1 through Load 12, are illustrated, as are 62 different power cells, C1 through C62, respectively. A semiconductor switch array, for example, a gate array and a central processor unit (CPU) are diagrammatically indicated. Preferably, the CPU is physically integrated into the switch array.

The credit card is in the form of a circuit board, and the cells in the battery array are preferably formed in pockets or through holes in the printed circuit board, as are the switch array, CPU, and the respective Loads. Preferably, the various components do not project out of the plane of the opposed external surfaces of the circuit board where the surfaces of the construct are anticipated to be subject to wear and tear as, for example, a credit card receives in use. Three different types of power cells are illustrated. See, for example, C1, C52, and C59. The cells are not arrayed in a regular pattern. The cells can be distributed to accommodate the locations of the Loads and connecting leads. The cells can be located wherever space is available. Also, cells can be grouped next to the loads that they are likely to serve. Cells C6, C61, C28, C50, C26, C37, and C13, for example, are located adjacent to load 7. The switch array can be programmed to preferentially, but not necessarily, assign these cells to supply power to Load 7. The Data Input-Output area in FIG. 1 corresponds to the magnetic stripe in conventional credit cards, but can also include provisions for visual output. The CPU and Switch Array are illustrated separately in FIG. 1, but the CPU is preferably integrated into the Switch Array. The three types of cells illustrated in FIGS. 1 and 2 by the different shapes of, for example, cells C41, C54, and C62 have different electrical power characteristics from one another. They can be combined by the Switch Array to form a power bus that provides a desired electrical power output. The different electrical power characteristics of the different cells provides great flexibility in tailoring the electrical power output of a particular bus. The substrate that supports the operative components in FIG. 1 is preferably sufficiently physically flexible to meet the standards set for credit cards. The [individual] *discrete* cells are small enough that they undergo small and non-destructive flexure even when the substrate is bent as much as 30 degrees, or even more.

A typical printed circuit board populated with an array of different power cells is illustrated in FIG. 2. The cells of which C65 is typical can, for example, be solar cells with a nominal output of 0.7 volts. The cells of which C63 is typical can, for example, be electrochemical cells with a nominal voltage output of 2.5 volts, and the cells of which C64 is typical can, for example, be radio frequency receivers with a nominal voltage output of 0.1 volts. A semiconductor switch array (not illustrated) is controllably associated with the power cells in FIG. 2. When the switch array detects that a load requires electrical power of a particular character, it assembles, for example, the cells in area 18 into the necessary series and partial configuration and connects the assemblage to the load. As the load changes or the characteristics of the cells change, the switch array forms a different instantaneous assemblage of cells as at area 14. Preferably, the cells are assigned by the switch array to only one single load at any given point in time as illustrated by the non-overlapping areas 18 and 14. Under some generally less preferred circumstances, usually for power management purpose, one cell can be assigned to more than one load as illustrated at the overlap of areas 14 and 16.

Generally, the nature of and functions performed by the electrical loads in the associated electrical circuit or circuits is not critical to the battery array except as the loads may influence the voltage output of the cells. That is, the dynamic battery array is adaptable to providing the power requirements of a wide variety of components or modules. The power requirements of two loads can be the same while the energy requirements are different. That is, while the power requirements are the same the voltage and current requirements are different. The design of a component or module can frequently be changed so as to eliminate electrical power conditioning elements because of the flexibility of the power providing dynamic battery array according to the present invention. The battery array, however, simply sees an electrical load with a particular power requirement. The battery does not see, for example, that a resistor has been eliminated from a circuit in a load because the battery array provides the exact tailored power characteristics required by the circuit without the need for the missing resistor.

Preferably, the semiconductor switch array (FIG. 4) includes a central processing unit, memory, and sensor capabilities, and is programmed so as to sense or know the instantaneous electrical power requirements of the various Loads A through D in the associated circuit (FIG. 5), and the electrical condition of each cell in the array. Those power requirements can change from time to time as, for example, on start-up where the power requirements typically drop after, for example, the first 500 milliseconds. The switch array, by connecting cells together into instantaneous power buses as illustrated in FIG. 6, instantaneously configures the battery to provide the instantaneous electrical power requirements of the various loads. As the power requirements of the loads change or the characteristics of the cells change the switch preferably continuously reconfigures the battery array to provide the required electrical power. To construct or form an instantaneous bus the switch array connects the positive and negative terminals of each battery cell to an I/O port. This allows any cell in the array to be connected to any other cell in the array. With particular reference to FIGS. 3, 4, and 5, to construct a series circuit composed of cells 1, 2, and 4, for example, the switch array connects the anode (negative) terminal for cell 1, to the cathode (positive) terminal for cell 2. Similarly, the Anode terminal for cell 2 is connected to the cathode terminal for cell 4. The terminal for the cathode of cell 1 is routed to the load of choice (for example, Load A). If a common ground is not desired, then the anode terminal of cell 4 is connected to the negative side of Load A. To construct a parallel circuit using cells 1, 2, 4, 5, 6, and 8, for example, the switch array connects the anode I/Os of each of the specified cells in continuity while all of the cathode I/Os for the specified cells are switched so they are in continuity. The ganged anodes and cathodes are then routed to two I/O ports that are connected to the load of choice.

Four instantaneous electrical power buses are illustrated in FIG. 6, one for each of loads A, B, C, and D (FIG. 5). A typical power cell is indicated at 22. The switch array (FIG. 4) determines, for example, that Load A requires at this instant the voltage developed by two cells in series, and the current developed by four cells in parallel. The appropriate low resistance semiconductor switches in the switch array are closed and the electrical power bus illustrated by the heavy line associated with Load A in FIG. 6 is instantaneously formed. Likewise the switch array determines that Load B at this instant requires the voltage of one cell and the current of three cells. The switch array determines that Load D now requires the current of one cell and the voltage of three cells. The switch array encounters a bad cell at 20. The switch array routes the power bus around cell 20 picking up the cell below it, and preferably marks cell 20 so that no attempt will be made to use it in the future. The switch array encounters another bad cell in forming the power bus for Load C, and similarly routes the instantaneous power bus around it. If the power bus for Load D is formed including cell 20 while cell 20 is functioning properly, as soon as cell 20 fails to meet the output requirements of Load D, the failure is detected by the switch array, cell 20 is dropped from the power bus, and another cell is picked up to replace the failed cell.

According to the present invention, many, if not all, of the electrical energy conditioning components can be eliminated from an electrical circuit by configuring an array of battery cells to provide each operating component in the circuit with the desired electrical energy directly from the battery cell array. As used herein, "electrical circuit" is intended to include all electrical circuits of whatever nature, including for example, electronic circuits. [Individual] *Discrete* battery cells in the battery cell array are, for example, connected together into a sub-array that is specially configured, either dynamically or statically (static sub-groupings of cells in dynamically associated sub-groupings), to supply exactly the voltage, amperage, and other electrical energy parameters that the associated operating component or module in the circuit requires. [Individual] *Discrete* battery cells are connected together, either dynamically or statically, in an appropriate mix of serial and parallel connections to achieve the desired output. Preferably, the [individual] *discrete* battery cells are built into the same substrate that supports the circuit so that the battery becomes part of the circuit.

Preferably, battery cell fault tolerance is provided. Fault tolerance can be provided during operation, for example, by a central processor unit operably associated with a suitable low resistance switch array of conventional design connected to the battery cells. Preferably, spare cells are provided, and, if a battery cell fails in use, or is defective as manufactured, it is automatically detected and replaced with one of the spare battery cells.

The electrical energy requirements of the various individual operating components or modules in a circuit are know to or otherwise recognized, for example, by a central processor unit. According to one preferred embodiment, the central processor unit dynamically maintains the configuration of the dynamic battery array so that each of the operating components or modules (loads) in the electrical circuit is supplied directly from the battery array with properly conditioned electrical energy. As cells fail or malfunction in this embodiment, they are dynamically replaced so that each electrical load in the circuit is continuously supplied with the optimum electrical energy. The conventional electrical energy conditioning components or modules are replaced with a dynamic electrical interconnection system for the battery cells. Preferably, the interconnection system also allows random selection of cells so that the cells are all fully fungible. Dynamic systems generally require the presence of a central processor unit to regulate the digital battery array, and semiconductor switches to dynamically and instantaneously form the required interconnections.

If numerous battery cells are applied, for example, lithographically, to a blank printed circuit board, usually several of them will malfunction or be totally inoperative as manufactured. Forming an excess number of cells on the board will provide enough functional cells to perform the required tasks. The cells are tested and the bad ones are identified. As an associated electrical circuit is applied to the circuit board, it is wired around the bad cells by the associated switch array. In this way, the quality control requirements and associated costs for manufacturing the battery cell array are reduced while the number of scrapped boards is minimized. Production rates are increased.

By populating the substrate upon which the associated electrical circuit is formed with a battery cell array, the lengths of the electrical connections between the cells and the operating components or modules are minimized. Electrical energy loses are thus further minimized.

The battery cell arrays can be regular, irregular, two- or three-dimensional as may be desired. The cells can be side by side with operating components, or in separate layers.

The present invention is not limited to any particular battery type. Suitable battery types include, for example, electrochemical, nuclear, capacitor, inductor, energy transistor, photovoltaic, and the like. Different types of cells can be included in the same array, if desired. The cells can be rechargeable or not, as desired. Where recharging is desired, suitable charging circuits can be employed.

The digital battery according to one embodiment is defined as an array of numerous [individual and] discrete battery cells, or other electrical energy-producing cells that are held in a predefined configuration by a neutral supporting matrix (i.e., the matrix does not produce electrical energy). The resulting physical configuration and composition allows, among other characteristics, a high degree of physical flexibility without damage to the [individual] *discrete* cells or the entire digital battery array itself. The degree of physical flexibility can be predetermined and fixed to optimize the characteristics so desired or they can be active and therefore modifiable. If they are modifiable, such modification can be passive or active. If passive, the physical flexibility can be decreased or increased as a function of past flexation history or past temperature, or other energy exposure. If active, the desired degree of flexibility can be controlled by electrorheological, magnitorheological, magnitostrictive action, piezoelectric actuators, and the like. Further, these cells can be electrically interconnected to produce desired voltages and current generating capabilities. This interconnectivity at the sub-group level can be static or dynamic. If the connectivity is dynamic, it can be controlled by low ON resistance electronic switches. The electronic switches can be grouped to form a bank of switches. This bank of switches can be composed of semiconductor elements such as transistors, CMOS, MOSFET, FET, phototransistors, spin transistors, and the like elements, or a combination of such elements. Further, these switches can be proximate to the digital battery, or physically integrated into the digital battery. These switches can be controlled by logic circuitry, a microcontroller, a microprocessor, or the like. This logical element can also be proximate to the digital battery, or physically integrated into the digital battery. Further, the switching elements can be controlled by the associated logical elements so that the desired connectivity between the battery cells can be controlled to yield desirable and useful electrical results. The resulting digital battery can be physically and electrically integrated into the electric circuit or circuit board. Preferably, the electronic switches, for example, semiconductor switches, are selected so that they have very low ON resistance, for example, less than approximately 0.5, and preferably less than approximately 0.01 ohms. Semiconductor switches that exhibit ON resistance of less than approximately 0.005 ohms are generally preferred. The use of power transistors is generally not preferred because they generally result in a drop of from about 0.7 to 1.4 volts. Most electrochemical battery cells generate from approximately 1.2 to 3.5 volts. A drop of 1.4 volts by reason of resistance in the switch would generally unacceptably degrade the output of the cell. The switches should not impair the output of the battery array. Semiconductor switches such as, for example, "trench type" MOSFETS are suitable for use as semiconductor switches according to the present invention. Since some ON resistance is inherent in the switches, this must be provided for in the design of the circuit-array system. Such resistance can also be utilized as a design feature. For example, if a load requires 1.2 Volts, and the cells nominally produce 1.55 Volts, the switch array can be selected so that the ON resistance of the switches reduces the output of the cells to the desired 1.2 Volts. Also, switches that individually exhibit high ON resistance can be ganged in parallel so that the total ON resistance is very low. The total resistance in parallel is given by the following equation: $r_{total}=1/r_1+1/r_2+1/r_3$. The occurrence of significant switch resistance is generally less preferred because energy is lost as heat. This reduces the efficiency of the dynamic battery array.

Digital battery arrays can be stacked, laminated or placed en face such that the digital battery arrays form a digital battery 3-Dimensional (3D) Array. This multiple layer configuration would therefore form a prismatically shaped battery. A thin-walled prismatically shaped container housing the prismatic digital battery is one possible physical form. Further, a digital battery array sheet can be scrolled to form a digital battery 3 dimensional array cylindrically shaped battery. A thin-walled cylindrical container housing the cylindrical digital battery is another possible physical form. The electrical connectivity as described for the digital battery Array applies to the digital battery two dimensional, three dimensional and irregular arrays.

A digital battery should have at least one of, and preferably both physical and electrical flexibility. The feature of physical flexibility allows the digital battery to be bent and contorted without damage, and that of electrical flexibility allows for more efficient use of the stored and finite quantity of battery energy. The degree of physical and electrical flexibility within a given embodiment of the digital battery can be modified to match the physical and electrical characteristics so desired.

In a variety of applications, it is advantageous to have a battery able to physically flex and bend without physically or electrically compromising the battery. Presently, there are no practical flexible batteries (defined as a battery that has approximately the same energy density Wh/Kg and volumetric energy density Wh/L and the same electrical characteristics in terms of shelf life [power retention], and current generating capacity that can be manufactured at a competitive price) that allow repeated flexing (defined as the ISO standards for maximal credit card bending, which requires a 1000 bends of a card such that the ratio of flex height to card length equals 0.2 (see ANSI/ISO/IEC 7810-1995 and ANSI/ISO/IEC 10373-1, which are hereby incorporated by reference). For instance, the ISO/IEC standards for financial transaction type cards (Card type ID-1) indicates that a standard 3.38" by 2.12" card, when compressed along its long axis must be capable of bend height of 0.69" without creasing or other damage including damage to smart card electronics. Further, this degree of bending without damage must be repeated using a repetition rate of 0.5 Hz for a minimum of 1000 cycles and then bent 1000 more times in the opposite direction. The use of discrete cells also permits the use of living hinges, or the like, in the substrate where the hinges to not intersect the cells. This allows very rigid material to be used as the substrate for the cell support areas (intracellular) while providing flexibility in the intercellular areas of the substrate.

The use of an array of discrete battery cell units minimizes flexation, torsion and shear forces that are experienced by the [individual] *discrete* cells. Therefore, the cell array can bend and flex in three dimensions while the [individual] *discrete* battery cells experience little or minimal flexation thus preserving the integrity of the cells and their connectivity. Reducing the size of the [individual] *discrete* cells generally increases the resistance of the array to damage from physical flexing. Flexing of the battery cell array does not induce appreciable flexing, torsion or shear force within a given [individual] *discrete* battery cell.

The [individual] *discrete* cells can be of any desired shape and with nominal diameters of as small as 0.1 centimeters, or smaller, down to the limits of the equipment employed in their fabrication. The nominal diameter is measured across the widest part of the cell. The nominal diameter of, for example, a rectangular cell is measured across the longest diagonal. The maximum size of the cells is dictated by the size of the space available for the array and the number of required cells. If, for example, the array is required to fit within an 8 square inch area, each cell generates 1.5 volts, and one component or module (load) in the associated electrical circuit requires 100 volts, there must be at least 67 cells. This requires a cell density in the array of more than 8 cells per square inch. There should be more cells to provide, for example, self-healing, redundancy, start-up capacity, and the like. Each cell necessarily covers an area of less than approximately 0.1 square inches. If several hundred square feet of area is available for the array, the [individual] *discrete* cells can be upwards of 1 to 2 or more square feet in area.

The use of a plurality of [individual] *discrete* cells provides great flexibility in design. An array of cells can be composed of different kinds of cells, for example, different sized cells, cells with different voltage and current output characteristics, a combination of dynamic and static cells, and the like. If, for example, one or more of the loads in a circuit requires 3 volts and each cell produces 1.5 volts, it is often desirable to hard wire several sets of 2 cells together and treat each of these hard wired pairs as one unit. These units are dynamically connected to the loads that require 3 volts or multiples of 3 volts. This reduces the number of required switches. The loads in an electrical circuit frequently require voltages that are not multiples of one another, for example, 3, 2.5, 4.2, and 7.1 volts, respectively. The use of cells that generate different voltages permits them to be combined to provide the desired voltage for each load.

The nature of the load to which it is connected often causes the voltage output of [an individual] *a discrete* cell to vary. A cell with, for example, a nominal voltage output of 1.5 Volts, upon the application of a particular load, may drop to 0.8 Volts. This condition frequently occurs at start-up. The load initially causes a very substantial drop in the voltage of the connected cells. This can be accommodated by dynamically configuring the array so that more cells are instantaneously connected to the load during the start-up phase, and disconnected as the voltage begins to rise.

What has been described with respect to dynamically and instantaneously combining cells to provide the voltage requirements of an electrical load are equally applicable to combining cells to meet the current requirements of an electrical load.

An electrical load can be tailored so that the voltage output of the cell is controlled to a desired value by the load. For example, a battery with a nominal output of 1.5 volts can be connected to a load that is tailored to reduce the cell's output to 1.1 Volts. Thus, a load that requires 1.1 Volts can be accommodated by a cell with a nominal voltage output of 1.5 Volts.

An array of discrete battery cells according to the present invention can be electrically connected in any manner (for example, any combination of series or parallel electrical configurations) to produce essentially any required voltage and current generating capacity that would normally be required by an electrical load. Further, a number of such cell groups can be configured to provide multiple voltage and current generating capacities. Further, these electrical configurations need not be temporally or spatially static, but can be changed along these dimensions to optimize electrical energy delivery to the device. Further, these temporally and spatially fluid electrical configurations may be used during recharging or electrical conditioning of the digital battery itself.

The cells, according to the present invention, can be composed of any of a variety of electrochemical battery couples such as zinc/manganese dioxide, zinc/silver oxide, lithium/cobalt oxide, nickel/cadmium, nickel/metal hydride, metal/air, and the like, or can be composed of a fuel cell couple, such as hydrogen/oxygen, or can be composed of a photovoltaic couple such as P and N doped silicon, or a nuclear cell (P N or PIN junction with an associated Beta particle emitter such as tritium). The cells can be composed of other electrical energy storage devices such as capacitors or inductors (the combination comprises a "tank circuit"). Further, the cells can be composed of any energy transducer that produces electrical current or charge such as a thermo voltaic cell (for example, bimetallic couple), an inductive element, a capacitive element (e.g., a piezoelectric element) or any combination of the above mentioned systems.

Cell packing, spacing, cell shape, and the like, can be any appropriate configuration and can be adjusted depending of the electrical current requirements (Ah, amperes). For example, the cell size for typical conventional portable consumer electronics is approximately 0.5 mm to about 2 cm in diameter.

The number of cells that are required to produce the required electrical characteristic can be employed. For instance, if 100 volts is required, and if the cells are composed of a nickel-nickel metal hydride electrochemical couple, which has an operating voltage between about 1.35 volts and 1 volt, then clearly the system would require about 100 cells (1.0 volts/cell)×(X cells)=100 volts, therefore X=100 volts/(1 cell/1.0 volts)=100 cells.

The cells can possess essentially any geometric shape, a preferable shape is circular with a height that is no greater than the diameter of the circle. Thus, the half-cell (for example, anode or cathode) possesses a three-dimensional shape that, at its minimum forms an essentially flat disk, and at its maximum forms a hemisphere.

The cells can be arranged in essentially any conformation, however, to achieve maximum energy density, (given no other constraints, such as the requirement to place other objects in between the cells) the cells can be arranged equidistantly to form a regular two- or three-dimension lattice.

Digital batteries according to the present invention can be constructed with a cell dome. For multilayer (rolled or Prismatic format) a regular grid of cell domes is generally preferred. The cell dome embodiment can be constructed as follows: A conductive foil or film sheet is used for the anode and cathode current collectors. The collectors are embossed to form a pattern of pockets into which appropriate battery chemistry is deposited by methods such as silk-screening, printing, spray coating, doctor blading, and the like, the contiguous inter-pocket areas can be coated with an adhesive. The anode and cathode sheets are then applied to opposite sides of a battery separator material. After such assembly, the current collector material is patterned (for example, by etching, or the like) to form current collectors over each [individual] *discrete* cell. Additionally, interconnects between cells can be so patterned. If the array of dome cells is to be used in a multiple layer structure, the dome cells can be interdigitated or nested to increase power density and form stability.

Core well arrays are often preferred for use within or on printed circuit boards or "In Board" configurations. The core well array is formed using a perforated non-conductive and non-absorbent core material (for example, polyvinyl chloride card). The core well array digital battery is composed of an ordered and laminated stack consisting, for example, of: a conductive cathode current collector (for example, copper foil); a cathode half core with well array (non-conductive, non-absorbent chemically resistant plastic); cathode chemistry within core wells; an adhesive layer (with release film); a battery separator (for example, microporous nylon); an adhesive layer (with release film); an anode half core with well array; anode chemistry within half core wells; and a conductive anode current collector. The Core Well Array is constructed, for example, as follows: the cathode half core stock is laminated on one face with a release film-backed adhesive layer; the adhesive laminated cathode half core stock is then punched through to produce an array of holes or wells; the remaining (outside) face of the punched half core is then laminated with an electrically conductive film or foil (for example, copper foil); the selected cathodic battery chemistry is then applied in a paste or viscous liquid form to the top and in-facing side of the half core and impressed into the holes (or wells) with a doctor blade, squeegee, roller or other appropriate method; the release film covering the adhesive layer on the top of the half core is then removed; a sheet of battery separator material is then applied to the adhesive (or thermoplastic material); a matching half core is then constructed as described above except that it is filled with an anodic chemistry selected to form an electrochemical couple with the above-mentioned cathode chemistry and no battery separator material is applied; and the top faces of the two complementary half cores are then pressed together in a fashion that maintains registration of the two cell well arrays. The resulting laminate will be surfaced with the two conductive current collector layers (for example, copper foil plated with protective or conductive plastics on one or both sides). The foil surfaces of the full core cell array can be etched or patterned to form the respective current collector anodes and cathodes for the [individual] *discrete* cells. Further, the conductive surfaces can be etched or patterned to form interconnects between selected cells. Vias or micro vias can be formed in the board space between the battery cells using standard or modified plate through techniques. The cell dome and cell well configurations can be combined by using one of the configurations for a half-cell and using the other configuration for the complimentary half-cell. This combination may be advantageous for example, if the array is integrated onto the surface of a printed circuit board. The well half of the array would then be laminated to the underlying printed circuit board while the dome half would reside on the surface of the printed circuit board. This configuration could potentially allow for additional heat transference, or gas exchange (for use in a hybrid fuel cell).

The digital battery according to the present invention eliminates power-conditioning devices by providing the circuit with its voltage and current requirements directly from the battery. The digital battery accomplishes this by allocating and connecting subsets of its cells to provide each element (load) within the electrical circuit with the voltage and current that it requires. This selective allocation of electrical power can be accomplished with a dynamic approach in which the cells within the digital battery are connected through a gate array in series, or parallel, (or a combination thereof) configurations to provide the specific electrical energy requirements of the various elements within the electrical circuit. Circuit elements with the same electrical requirements can receive power from the same specific cell grouping, preferably, however, each electrical load is provided with its own cell set that is not shared with other loads. Such provision of different sets of cells is particularly desired: if for instance, electrical isolation, electrical routing, or other factors are of import.

Battery reliability is increased by the ability of the digital battery to isolate defective units and actively replace them with cells that are held in reserve or by reconfiguration of the cell connectivity. This should be contrasted with the conventional technology in which a shorted or open circuit cell or a defective cell will generally result in complete battery failure. Furthermore, in single cell batteries (for example, a 1.5 volt D size cell) an isolated internal short generally results in battery failure. Conversely, according to the present invention, an isolated short in a given digital battery cell will only result in the loss of the power generating capacity of that specific cell. The power generating capacity of this cell might only represent 1 percent of the total power generating capacity of the digital battery array.

It is appreciated that close apposition (for example, thin anodes and cathodes that are applied to the separator with some degree of pressure) between the anode and cathode reduces internal battery cell resistance. This in turn results in less energy dissipated and wasted as resistive heat. The digital battery, according to one embodiment is composed of a relatively thin planar array of cells. As such, the anodes and cathodes of these cells are positioned relatively close together. In addition, because of the relatively large circumferential distance of the cell seals and the relatively small diameter of the [individual] *discrete* cells the pressure that can be exerted on the internal battery chemistry can be considerably greater than that applied to the chemistry of conventional wafer batteries. This factor further lowers the internal resistance of the digital battery cells and thus increases their efficiency and the magnitude of its current generating capacity.

Many components in an electrical circuit, including resistors, other passive and active devices, and the like, associated with power conditioning, can be eliminated according to the present invention.

When electrical energy is provided according to the present invention, fewer of the heavy inductive elements that are associated with power conditioning are required. Thus, smaller circuit boards are possible. Smaller printed circuit boards equal smaller products, which in turn equals lighter products.

Roll-to-roll production, with the capability of testing each cell independently reduces cell production costs. [Individual] *Discrete* cell electrical characteristics can be monitored and rated with digital battery cell arrays with the best overall electrical characteristics being designated, for instance as "premium" (for example, those sectors or arrays that show no bad cells) while those showing poorer electrical characteristics (for example, a higher number of defective cells per unit area) will be graded accordingly. Even arrays with defective elements can be used, for example, in applications that do not require the highest power density. This should be contrasted with the conventional requirement of battery manufacturers to discard batteries in which one or more cells are defective. Thus, it can be readily appreciated that the manufacture of the digital battery according to the present invention will result in much less production waste and therefore a decrease in production cost.

Decreased electronic product costs results from a variety of factors that are associated with the present invention, including, for example: a large reduction in the number of required voltage and current conditioning components such as transformers, inverters, charge boosters, converters, buck regulators, and the like, and their associated passives. Elimination of the above-mentioned components, in turn, reduces the required circuit board size. Reduction in circuit board size generally allows for a reduction in the product size. This conserves materials and increases the desirability of the product. Decreased weight and size of resulting electronic products becomes possible as heavy current conditioning components are eliminated. New and highly desirable electrical products become possible (for example, powered Smart Cards). With fewer components, reliability increases. Voltage and Current conditioners consume electrical power that is lost as heat. Fewer conditioners result in less energy lost as heat. The digital battery array format according to the present invention is compatible with leading edge ball grid chip and flip chip semiconductor packaging configurations.

In many instances, battery failure is caused by a local event such as dendritic fenestration or breaching of the battery separator. This event is localized, but, in the conventional battery format, shorts the entire battery. When such dendrite induced shorting occurs in the digital battery array according to the present invention, only the cell in which the short occurs will be compromised since this cell can be switched out of the battery circuit and electrically isolated from the other cells. In so doing, the functionality of the remaining battery is preserved. Thus, the life of the battery is increased. Furthermore, the probability for compromise increases with the surface area of the battery. Thus, batteries with large surface areas (or those that have many integral cells) are more prone to a shortened life due to a localized defect.

A general problem with rechargeable portable electronic products is that they must be recharged with a specific recharger. If the specific recharger is unavailable (it is lost, or wasn't brought along) or can't be used for a variety of reasons (the recharger uses 110 Volts AC to produce an output of 9 Volts DC but the user is in a vehicle that only supplies 12 Volts DC), the electronic device can't be recharged and becomes useless. The digital battery solves this problem by allowing the reconfiguration of the battery cells such that a variety of common electrical power supplies can be used for recharging. Thus, in the above described situation where the device would normally only accept 9 Volt DC, the 3 Volt DC cells of the digital battery could be reconfigured under electrical logic control to form serial groups of 4 (3 Volts=4=12 Volts) so that the electrical device could use the 12 Volt cigarette lighter socket to recharge the device.

With conventional technology, electrical power must be routed from its localized source across the entire printed circuit board. This requires long current [barring] *bearing* traces (thick and wide) that take up a considerable amount of board space (many thick and wide traces), and, because of their length and finite electrical resistance, consume electrical power (converting it into undesirable heat) as well as causing an undesirable voltage drop. The digital battery can minimize the board space used by power traces as well as minimize the loss of power (and voltage) due to power trace electrical resistance by providing a distributed power source across the areal extent of the printed circuit board. For instance, if a specific device requires 9 volts, then at least three of the 3-volt cells that were positioned closest to the device could be connected in series to provide the required 9-volt power to the device.

In some instances it is desirable to electrically isolate various electrical components from each other. Presently, this is accomplished by a variety of techniques including the use of optoisolators, transformers, separate battery supplies, and the like. All of these approaches induce added expense and complexity to the electrical device. The digital battery according to the present invention allows for electrical isolation of individual components by providing, if needed, separate power supplies for each electrical element. This is accomplished by electrically subdividing the digital battery array such that a subset of the digital battery cells can exclusively power a specific electrical component.

An electrochemical battery cell, depending on its specific chemistry, will have different voltage and current producing capabilities. These capabilities can change markedly depending on, among other things, the time of discharge. For instance, a cell will usually provide more current at a higher voltage during a short initial interval of discharge. This initial "burst" is followed by current generating capability that is substantially lower than the initial burst. In some circumstances, it is desirable to extend this initial burst of current providing capacity longer than is possible with conventional expedients. The digital battery can provide for a longer duration of peak current generation by, among other things, allowing for volley cycling between banks of cells such that a new set of cells is turned on as soon as the initial set of cells is no longer capable of maintaining the required high discharge rate. As soon as the next bank of cells pass their "temporal output peak" the original set of cells can be switched into the circuit once again to provide the required high current. This is possible because after a short time electrochemical cells are capable of recuperation so that they are once again capable of supplying their initial high current output. This is in part due to diffusion dynamics within the cell.

In some instances it is desirable to alter the spatial arrangement of the cells that are being used in a given battery. The digital battery can provide for such spatial modulation whereas conventional battery technology does not provide for this feature. For instance, to avoid overheating either the battery or components within the electrical circuit, the active digital battery cells can be spatially separated from other cells or from the hot elements. In this way heat dissipation can be maximized. Alternatively, if, for instance, an electrical device is used in a cold environment it can be advantageous to group the active digital battery cells and thus limit heat dissipation. This is desirable because power production by batteries can be hampered by low temperature.

Because, for example, a Dome Cell Array has high configurational flexibility and can be shaped 3-dimensionally, it is possible to incorporate the digital battery into injection molded objects such as the case or enclosure of the electrical device itself. Such overmolding of the digital battery allows the device to be made more compact since no separate battery compartment is required.

Some battery chemistries are endothermic when discharged (for example, lead-acid), or when charged. Therefore, it is possible to cool electrical components on the circuit board by using and discharging endothermic cells that are adjacent to the element requiring cooling. Alternatively, if the cell's chemistry is endothermic while charging, the cells adjacent to the element requiring cooling could be recharged by cells that are adjacent to the element requiring cooling.

The electrical flexibility of the battery array is such that some of the cells can be charged while others are being discharged through use. The charge level can differ between cells, and some cells can be charging while others are discharging. Where one or more cells is absorbing energy this can be used in power regulation.

A printed circuit board with digital battery integration is suitable for use as a Smart Card. A digital battery molded into a wrist band or camera strap finds wide application in powering watches and cameras.

The connectivity between the cells is preferably under random access control in a dynamic configuration. As such, any specific cell can be connected to any other cell in parallel and/or serial configuration.

The dynamic battery array is preferably supported on a substrate. The substrate must be compatible with the requirements of the cells. Where the cells are electrochemical in nature, the substrate must confine a liquid electrolyte, if one is used. Where gasses are generated or consumed by the power cell (as, for example, in fuel cells) the substrate must confine the gas or in some instances it must be selectively permeable to a selected gas. For example, oxygen can be used by the cathode in a hybrid fuel cell, and gas fuels are used for the anode of a fuel cell. The substrate can be required to accommodate the expansion and contraction of cells during charge or discharge, and must withstand the temperature cycles of the cells.

Where the power requirements of a particular load are very low, charging can be accomplished through the use of one or more radio frequency antennas. Radio frequency energy can be used for charging purposes or, in some instances, as a direct source of power.

Cell packing, spacing, cell shape, and the like, can be any appropriate configuration and can be adjusted depending of the electrical current requirements (Ah, amperes). For example, the cell size for typical portable consumer electronics is approximately 0.5 mm to about 2 cm in diameter. While not wishing to be bound by any theory, it is believed that the size of the cells can be reduced to the atomic level with appropriate nano-manufacturing techniques and processes. Theoretically, the battery cells could be reduced to the numbers of atoms and molecules representing a stochiometric formula. For example, one lithium ion and a carbon nanotube consisting of a ring of about 6 carbon atoms for an anode, and a few molecules of cobalt oxide as the cathode would theoretically comprise a battery cell.

The digital battery can allow for the first time, a practical method by which the size and volume of the [individual] *discrete* electrochemical cells can be greatly reduced without appreciably reducing the voltage or current generating capacity of the entire battery itself. From the fields of physics and chemistry, it is clear that the underlying laws governing physical phenomena undergo a substantial change in their characteristics at some small dimension. This phenomena has been generally termed the "quantum effect." These quantal effects, for instance, have recently been extended and are now found to exist for electrical "super" conductivity in carbon nanotubes, and in the unexpectedly high efficiency for the generation of light from diode "quantum well" junctions. From these and other observations, it is believed that there will exist a "Quantum Electrochemical Well Effect" when the size and volume of the electrochemical cell is reduced to some critical value. At this point it is believed that the energy density and the instantaneous current generating capacity will substantially change in a non-linear fashion.

What have been described are preferred embodiments in which modifications and changes may be made without departing from the spirit and scope of the accompanying claims. Many modifications and variations of the present invention are possible in light of the above teachings. It is therefore to be understood that, within the scope of the appended claims, the invention may be practiced otherwise than as specifically described.

What is claimed is:

1. A digital battery comprising:

a substrate that is incapable of producing electrical energy;

a plurality of discrete *electricity generating* cells supported in an array by said substrate[, individual ones of said cells being capable of providing electrical energy], said array being electrically interconnected through an electrical interconnection system, said electrical interconnection system being [changeably] *dynamically* configurable responsive to signals from an interconnection controller;

an [electrical] *electronic* circuit operatively connected to said array, said [electrical] *electronic* circuit including at least two *electrical* loads that require different electrical energy conditions, said interconnection controller being adapted to *dynamically* configure said electrical interconnection system so that individual ones of said plurality of discrete *electricity generating* cells are interconnected to provide each of said two *electrical* loads with the required different electrical energy conditions, *whereby the electrical energy condition of the electrical energy supplied through said electrical interconnection system is dynamically tailored to the individual requirements of the respective electrical loads.*

2. A digital battery comprising:

a physically flexible substrate that is incapable of producing electrical energy;

a plurality of discrete *electricity generating* cells supported in an array by said substrate[, individual ones of said cells being capable of providing electrical power], said array being *dynamically and* electrically interconnected through a semiconductor switch array;

an electrical circuit operatively connected to said array, said electrical circuit including at least two *electrical* loads that require different instantaneous electrical energy conditions, said semiconductor switch array interconnecting said individual ones of said *discrete electricity generating* cells to provide *at least* each of said two *electrical* loads with the required different *instantaneous* electrical energy conditions, *whereby the instantaneous electrical energy condition of the electrical energy is dynamically tailored to the individual requirements of the respective electrical loads.*

3. A process of forming a digital battery comprising:

selecting a substrate that is incapable of producing electrical energy;

forming a plurality of discrete *electricity generating* cells supported in an array by said substrate, [individual ones of said cells being capable of providing electrical energy,] said array being *dynamically and* electrically interconnected through an electrical interconnection system;

providing an electrical circuit operatively connected to said array, said electrical circuit including at least two [components] *electrical loads* that require different electrical energy conditions, said electrical interconnection system *being adapted to dynamically* interconnecting *between* said individual ones of said *discrete electricity generating* cells *and said electrical loads* to provide *at least* each of said two [components] *electrical loads* with the required different electrical energy conditions, *whereby the electrical energy condition of the provided electrical energy is dynamically tailored to the individual requirements of the individual electrical loads.*

4. A complex electronic device including a plurality of [individual] *discrete electricity generating* power cells, said complex electronic device comprising:

a plurality of individual *electrical* loads *different ones of which require electrical energy with different parameters*;

a plurality of [power] *electrically* conductive paths conductively, *dynamically,* and selectively associatable with each of said [individual] *discrete electricity generating* power cells and each of said individual *electrical* loads;

a plurality of semiconductor switches operatively associated with said plurality of [power] *electrically* conductive paths, said semiconductor switches being adapted to substantially dynamically [selecting] *select* at least one of said [individual] *discrete electricity generating* power cells to form [a power selection, and to form said power selection into an individual power] *a first instantaneous individual electrical* bus for one of said individual *electrical* loads, *and to substantially dynamically select at least one of said discrete electricity generating power cells to form at least a second instantaneous individual electrical bus for a second of said individual electrical loads, whereby respective individual electrical loads are dynamically connected through instantaneous individual electrical buses to generally separate sub-sets of said discrete electricity generating power cells to provide such respective individual electrical loads with electrical energy having the parameters required for the operation of such respective individual electrical loads at the moment.*

5. A complex electronic device of claim 4 wherein said [individual] *discrete electricity generating* power cells are selected randomly from said plurality of [individual] *discrete electricity generating* power cells to form said [power selection] *individual electrical buses.*

6. A complex electronic device of claim 4 including a programmable switch array, said programmable switch array including said semiconductor switches.

7. A system comprising:

a power array, said power array including a plurality of separate *electrical* power generating cells;

an electronic circuit, said electronic circuit including at least first and second *electrical* loads, said first and second *electrical* loads requiring *electrical* power for their operation, the *parameters of the electrical* power required to operate said first *electrical* load being different from the *parameters of the electrical* power required to operate said second *electrical* load; and a programmable switch array between said power array and said electronic circuit, said programmable switch array being adapted to dynamically forming individual *electrical* power buses between *sub-sets of said electrical power generating cells in* said power array and [each of said first and second] *respective ones of said electrical* loads, [said individual power buses being formed from said separate power generating cells, substantially all of] said separate *electrical* power generating cells being substantially instantaneously fungible between said individual *electrical* power buses, *whereby the parameters of the electrical power supplied by said individual electrical power buses are dynamically tailored to the individual requirements of the individual electrical loads.*

8. A system of claim 7 wherein said programmable switch array includes a plurality of semiconductor switches, said semiconductor switches have an ON resistance of less than approximately [0.5] *0.01* ohms.

9. A system of claim 7 wherein said power array includes enough of said separate *electrical* power generating cells to provide a plurality of normally spare separate *electrical* power generating cells.

10. A system of claim 7 wherein [said electronic circuit includes more than two loads and the power requirements of each of said loads is different] *substantially all of said separate electrical power generating cells are substantially instantaneously fungible between said individual electrical power buses.*

11. A system of claim 7 wherein *at least some of* said *electrical* power generating cells are electrochemical cells.

12. A system of claim 7 wherein said system is mounted on a physically flexible substrate.

13. A method of providing instantaneous individual *electrical* power buses for *different electrical* loads in an electronic circuit comprising:

selecting a power array including a plurality of *electricity generating* power cells;

selecting a said electronic circuit including a plurality of *said electrical* loads, said loads requiring *electrical* power for their operation, *and at least one of said electrical loads differing from at least one other of said electrical loads in requiring at least one different electrical parameter in the electrical energy required for operation;* dynamically selecting at least a first said *electricity generating* power cell from said power array, and poweringly associating said first *electricity generating* power cell with a first of said *electrical* loads to form a first *individual electrical* power bus; and dynamically selecting at least a second said *electricity generating* power cell from said power array, and poweringly associating said second *electricity generating* power cell with a second of said *electrical* loads to form a second *individual electrical* power bus, [all of the] said *electricity generating* power cells on said first *individual electrical* power bus being different from the said *electricity generating* power cells on said second *individual electrical* power bus, said forming of said first and second *individual electrical* power buses including establishing electrical connections using semiconductor switches having an ON resistance of less than approximately 0.5 ohms, and said semiconductor switches being actuated to establish said electrical connections responsive to control signals generated by a programmable switch array, *whereby the parameters of the electrical energy supplied by said individual electrical power buses are dynamically tailored to the individual requirements of the individual electrical loads.*

14. A complex electronic device of claim 13 including a plurality of said semiconductor switches operatively associated with said plurality of individual said *electrical* power buses, said semiconductor switches being adapted to substantially dynamically forming said individual *electrical* power buses from said individual *electricity generating* power cells and maintaining at least one [power] *electrical energy* characteristic on at least one of said individual power [busses] *buses* at substantially a predetermined value by substantially instantaneously switching individual *electricity generating* power cells into and out of said one individual *electrical* power bus.

15. An [electrical] *electronic* device comprising:

a plurality of [individual] *discrete* power cells;

a plurality of individual [electric] *electrical* loads *in a complex electronic circuit, including at least first and second individual electrical loads that require electrical energy with different parameters such that if said first and second individual electrical loads were to both be supplied with electrical energy having the same parameters at least one of said first and second individual electrical loads would require that the parameters of the electrical energy so supplied be adjusted by at least one electrical energy conditioning component to the different parameters required by said at least one individual electrical load*;

a plurality of semiconductor [switcher] *switches* adapted to substantially simultaneously and instantaneously poweringly associating at least a first of said [individual] *discrete* power cells with [a] *said* first [of said] individual electrical [loads] *load* and at least a second of said [individual] *discrete* power cells with [a] *said* second [of said] individual electrical [loads] *load*, at least said first and second [individual] *discrete* power cells being substantially fungible between said first and second individual electrical loads, *whereby said one individual electrical load is provided with electrical energy having the parameters such one individual electrical load requires without using said electrical energy conditioning component.*

16. An [electrical] *electronic* device of claim 15, substantially all of said [individual] *discrete* power cells being substantially fungible between substantially all of said individual [electric] *electrical* loads.

17. An [electrical] *electronic* device of claim 15, said plurality of semiconductor switches being adapted to substantially instantaneously poweringly associating at least two of said [individual] *discrete* power cells with [a] *said* first [of said] individual electrical [loads] *load*.

18. A method of powering an [electrical] *electronic* device comprising:

selecting a plurality of [individual] *discrete electricity generating* power cells;

selecting a plurality of individual electrical loads in said [electrical] *electronic* device, *including at least first and second individual electrical loads that require electrical energy with different parameters such that if said first and second individual electrical loads were to both be supplied with electrical energy having the same parameters at least one of said first and second individual electrical loads would require that the parameters of the electrical energy so supplied be adjusted by using at least one electrical energy conditioning component to form electrical energy having the different parameters required by said at least one individual electrical load*;

selecting a plurality of actuatable semiconductor switches, said plurality of semiconductor switches being *electrical* power bus formingly associated between said plurality of [individual] *discrete electricity generating* power cells and said plurality of individual electrical loads;

actuating said plurality of actuatable semiconductor switches; and allowing at least first and second individual *electrical* power [busses] *buses* to [substantially instantaneously and simultaneously] *dynamically* form, said first individual *electrical* power bus being between at least a first of said [individual] *discrete electricity generating* power cells and [a] *said* first [of said] individual electrical [loads] *load*, and said second individual *electrical* power bus being between [as] *at* least a second of said [individual] *discrete electricity generating* power cells and [a] *said* second [of said] individual electrical [loads] *load, whereby said one individual electrical load is provided with electrical energy having said different parameters said one electrical load requires without using said electrical energy conditioning component.*

19. A method of claim 18 including allowing at least said first individual *electrical* power bus to form between at least two of said [individual] *discrete electricity generating* power cells and said first individual electrical load.

20. A method of claim 18 including allowing [at least three of said individual power busses to] *said first and second individual electrical power buses to substantially instantaneously and simultaneously* form.

21. A method of powering an [electrical] *electronic* device comprising:

selecting a plurality of [individual] *discrete electricity generating* power cells;

selecting a plurality of individual electrical loads in said [electrical] *electronic* device;

selecting a plurality of actuatable semiconductor switches, said plurality of semiconductor switches being dynamically *electrical* power bus formingly associated between said plurality of [individual] *discrete electricity generating* power cells and said plurality of individual electrical loads;

actuating said plurality of actuatable semiconductor switches;

allowing at least first and second individual *electrical* power [busses] *buses* to dynamically and substantially instantaneously and simultaneously form, said first individual *electrical* power bus being between at least a first and second of said [individual] *discrete electricity generating* power cells and a first of said individual electrical loads, and said second individual *electrical* power bus being between at least a third one of said [individual] *discrete electricity generating* power cells and a second of said individual electrical loads, said first individual *electricity generating* power bus having first instantaneous *electrical* energy characteristics and said second *electrical* power bus having second instantaneous *electrical* energy characteristics, said first and second instantaneous *electrical* energy characteristics being different from one another *at least as to voltage*; and establishing said first and second instantaneous *electrical* energy characteristics [at desired values] by dynamically adding and removing said [individual] *discrete electricity generating* power cells to said first and second individual *electrical* power [busses] *buses*.

22. An electrical device comprising:

a substrate, said substrate being populated by a plurality of discrete *electricity generating* power cells, [and] *said* discrete *electricity generating* power cells being distributed about and integrated with said substrate;

a plurality of electrical modules [mounted on] *supported by* and distributed about said substrate, *said electrical modules requiring electrical energy for their operation*, the *electrical* energy requirements for the operation of at least a first of such electrical modules being different from the *electrical* energy requirements for the operation of a second of said modules *at least as to voltage*;

a switch array adapted to substantially instantaneously *electrically* poweringly associating at least a first of said discrete *electricity generating* power cells with said first electrical module and at least a second of said discrete *electricity generating* power cells with said second electrical module, said switch array being adapted to dynamically *electrically* re-poweringly associating said discrete *electricity generating* power cells with said electrical modules responsive to at least changes in said *electrical* energy requirements.

23. An electrical device of claim 22 wherein a sub-group of said discrete *electricity generating* power cells is physically positioned next to a sub-group of said electrical modules [on said substrate], and said switch array is adapted to preferentially *electrically* poweringly associating said sub-group of discrete *electricity generating* power cells with said-sub-group of electrical modules.

24. An electrical device of claim 22 wherein said substrate includes at least first and second physical areas, at least first and second *electricity generating* power cell sub-groups, and at least first and second electrical module sub-groups, each of said first and second *electricity generating* power cell sub-groups being composed of at least two of said discrete *electricity generating* power cells, each of said first and second electrical module sub-groups being composed of at least one of said electrical modules, and first *electricity generating* power cell sub-group and said first electrical module sub-group being physically located in said first physical area of said substrate, and said switch array being adapted to preferentially *electrically* poweringly associating said first *electricity generating* power cell sub-group with said first electrical module sub-group.

25. A method of *electrically* powering an electrical device comprising:

selecting a plurality of [individual] *discrete electricity generating* power cells, said *discrete electricity generating* power cells being [integral with] *supported by* a substrate;

selecting a plurality of individual electrical loads in said electrical device, said individual electrical loads resulting from the operation of electrical components [mounted on] *supported by* said substrate;

selecting a plurality of actuatable semiconductor switches, said actuatable semiconductor switches having ON resistances of less than about 0.5 ohms, said plurality of semiconductor switches being dynamically *electrical* power bus formingly associated between said plurality of [individual] *discrete electricity generating* power cells and *said* plurality of individual electrical loads;

actuating said plurality of actuatable semiconductor switches;

allowing at least first and second individual *electrical* power [busses] *buses* to dynamically and substantially instantaneously form, said [firsts] *first* individual *electrical* power bus being between at least a first and second of said [individual] *discrete electricity generating* power cells and a first of said individual electrical loads, and said second individual *electrical* power bus being between at least a third *one* of said [individual] *discrete electricity generating* power cells and a second of said individual electrical loads, said first individual *electrical* power bus having first instantaneous *electrical* energy characteristics, and said second *individual electrical* power bus having second instantaneous *electrical* energy characteristics, said first and second instantaneous *electrical* energy characteristics being different from one another and changing over time; and establishing said first and second instantaneous *electrical* energy characteristics at desired values by dynamically adding and removing said [individual] *discrete electricity generating* power cells from time to time to said first and second individual *electrical* power [busses] *buses*.

26. A method of claim 25 wherein said plurality of actuatable semiconductor switches includes semiconductor switches ganged in parallel to reduce the total ON resistance of said included semiconductor switches to less than about 0.5 ohms.

27. An electrical device of claim 26 wherein said first and second discrete *electricity generating* power cells and said first and second electrical modules are completely embedded within said substrate between [said] opposed external surfaces *of said substrate*.

28. An electrical device of claim 26 wherein substantially all of said discrete *electricity generating* power cells and electrical modules are completely embedded within said substrate between [said] opposed external surfaces *of said substrate*.

29. An electrical device comprising:

a substrate, said substrate having a thickness between opposed external surfaces and being populated by a plurality of [Discrete] *discrete electricity generating* power cells, said discrete *electricity generating* power cells being distributed about and [integrated with] *supported by* said substrate, and at least some of such discrete *electricity generating* power cells being at [lest] *least* partially embedded within said substrate between said opposed [exrernal] *external* surfaces;

a plurality of electrical modules [mounted on] *supported by* and distributed about said substrate, at least some of said electrical modules being at least partially embedded within said substrate between said opposed external surfaces, said electrical modules having *electrical* energy requirements for their operation, and the *electrical* energy requirements for operating a first of said electrical modules being different from the *electrical* energy requirements for operating a second of said electrical modules;

a switch array adapted to substantially instantaneously *electrically* poweringly associating at least a first of said discrete *electricity generating* power cells with said first electrical module and at least a second of said discrete *electricity generating* power cells with said second electrical module, said switch array being adapted to dynamically *electrically* re-poweringly associating said discrete *electricity generating* power cells with said electrical modules responsive to changes in said *electrical* energy requirements or said discrete *electricity generating* power cells.

30. An electrical device comprising:

a substrate, said substrate being physically flexible and being populated by a plurality of discrete *electricity generating* power cells, said discrete *electricity generating* power cells being capable of generating *electrical* energy and being distributed about and [integrated with] *supported by* said substrate, said substrate having at least first and second areas, said first area comprising at least about 8 such discrete *electricity generating* power cells per square inch;

a plurality of electrical modules [mounted on] *supported by* and distributed about said substrate, said electrical modules having *electrical* energy requirements for their operation, and the *electrical* energy requirements for operating a first of said electrical modules being different from the *electrical* energy requirements for operating a second of said electrical modules;

a switch array adapted to substantially instantaneously *electrically* poweringly associating at least a first of said discrete *electricity generating* power cells with said first electrical module and at least a second of said discrete *electricity generating* power cells with said second electrical module, said switch array being adapted to dynamically re-poweringly associating said discrete *electricity generating* power cells with said electrical modules responsive to changes in said *electrical* energy requirements or in the *electrical* energy [generation of] *generated by* said discrete *electricity generating* power cells.

31. An electrical device of claim 30 wherein at least some of said discrete *electricity generating* power cells and electrical modules are located substantially between opposed external surfaces of said substrate.

32. An electrical device of claim 30 wherein said substrate has an unbent length and said substrate is adapted to being repeatedly bent to a height such that the ratio of the height of the bent substrate to the unbent length is approximately 0.2 without substantially impairing the integrity or connectivity of said discrete *electricity generating* power cells.

33. An electrical device comprising:

a substrate comprising at least a first area, said substrate being populated by a plurality of discrete *electricity generating* power cells, said discrete *electricity generating* power cells being distributed about and integrated with said substrate, and said first area having at least about 8 of said discrete *electricity generating* power cells per square inch;

a plurality of electrical modules [mounted on] *supported by* and distributed about said substrate, the *electrical* energy requirements for the operation of at least a first of such electrical modules being different from the *electrical* energy requirements for the operation of a second of said modules;

a switch array adapted to substantially instantaneously *electrically* poweringly associating at least first of said discrete *electricity generating* power cells with said first electrical module at least a second of said discrete *electricity generating* power cells with said second electrical module, said switch array being adapted to dynamically *electrically* re-poweringly associating said discrete *electricity generating* power cells with said electrical modules responsive to at least changes in said *electrical* energy requirements.

34. An electrical device of claim 33 wherein said discrete *electricity generating* power cells are electrochemical cells and the components of at least some of said electrochemical cells are under pressure.

* * * * *